United States Patent
Derr et al.

(10) Patent No.: US 10,520,646 B2
(45) Date of Patent: Dec. 31, 2019

(54) HAPTIC RAIN SENSOR

(71) Applicant: WeatherFlow, Inc., Scotts Valley, CA (US)

(72) Inventors: Robert John Derr, Deland, FL (US); David St. John, New Smyrna Beach, FL (US)

(73) Assignee: WeatherFlow, Inc., Scotts Valley, CA (US)

( * ) Notice: Subject to any disclaimer, the term of this patent is extended or adjusted under 35 U.S.C. 154(b) by 104 days.

(21) Appl. No.: 15/594,388

(22) Filed: May 12, 2017

(65) Prior Publication Data

US 2017/0329049 A1 Nov. 16, 2017

Related U.S. Application Data

(60) Provisional application No. 62/335,945, filed on May 13, 2016.

(51) Int. Cl.

| | |
|---|---|
| *G01W 1/14* | (2006.01) |
| *G01L 1/16* | (2006.01) |
| *G01V 3/02* | (2006.01) |
| *G01W 1/10* | (2006.01) |
| *G01V 3/08* | (2006.01) |
| *G01L 1/14* | (2006.01) |

(52) U.S. Cl.
CPC ............... *G01W 1/14* (2013.01); *G01L 1/14* (2013.01); *G01L 1/16* (2013.01); *G01V 3/02* (2013.01); *G01V 3/088* (2013.01); *G01W 1/10* (2013.01)

(58) Field of Classification Search
CPC .... G01L 1/14; G01L 1/16; G01V 3/02; G01V 3/088; G01W 1/10; G01W 1/14
USPC ..... 702/3, 13, 14, 182–185, 188; 73/170.16, 73/170.17, 170.21; 318/443
See application file for complete search history.

(56) References Cited

U.S. PATENT DOCUMENTS

| | | |
|---|---|---|
| 1,495,852 A | 5/1924 | Kunze |
| 3,446,069 A | 5/1969 | Zink |
| 4,038,870 A | 8/1977 | Rotier |
| 5,125,268 A | 6/1992 | Caron |

(Continued)

FOREIGN PATENT DOCUMENTS

| | | |
|---|---|---|
| DE | 4434432 | 5/1996 |
| EP | 0422553 | 4/1991 |

(Continued)

*Primary Examiner* — John H Le
(74) *Attorney, Agent, or Firm* — Van Pelt, Yi & James LLP (57) ABSTRACT

A system for detecting precipitation is disclosed. In an embodiment, the system includes a capacitive sensor configured to detect a presence of precipitation, a piezo sensor configured to be powered on in response to detection of the presence of the precipitation by the capacitive sensor, and a processor configured to detect a characteristic of the precipitation based at least in part on an output of the piezo sensor. In an embodiment, a method includes receiving a signal from a piezo sensor, sampling the signal at a sampling rate, determining a frequency domain representation of the sampled signal, determining that a magnitude of a resonant frequency associated with the sampled signal meets a threshold, and determining a valid precipitation event based at least in part on the determination that the magnitude of the resonant frequency meets the threshold.

12 Claims, 6 Drawing Sheets

(56) References Cited

U.S. PATENT DOCUMENTS

| | | | |
|---|---|---|---|
| 5,203,207 | A | 4/1993 | Sugiyama |
| 7,249,502 | B2 | 7/2007 | Luukkala |
| 7,315,781 | B2 | 1/2008 | Litchfield |
| 8,448,507 | B2 | 5/2013 | Salmi |
| 10,078,156 | B2 * | 9/2018 | Nylander ................ G01W 1/14 |
| 2005/0016276 | A1 | 1/2005 | Guan |
| 2005/0017666 | A1 | 1/2005 | Pankey |
| 2007/0157721 | A1 | 7/2007 | Veerasamy |
| 2008/0034859 | A1 | 2/2008 | Runge |

FOREIGN PATENT DOCUMENTS

| | | |
|---|---|---|
| WO | WO 2015071545 | 5/2015 |
| WO | WO-2015087167 | 6/2015 |

\* cited by examiner

HAPTIC RAIN SENSOR

CROSS REFERENCE TO OTHER APPLICATIONS

This application claims priority to U.S. Provisional Patent Application No. 62/335,945 entitled HAPTIC RAIN SENSOR filed May 13, 2016 which is incorporated herein by reference for all purposes.

BACKGROUND OF THE INVENTION

Weather sensing and forecasting devices are useful for preparing for weather changes and natural disasters. As weather sensing and forecasting devices become more compact and accessible to consumers, these devices are finding application in homes and small businesses such as farms. The deployment of weather sensing devices in homes and small businesses allows for information to be collected and determined about the weather and environment of a particular location. However, conventional weather sensing devices are typically power intensive. In addition, conventional weather sensing devices can be inaccurate.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A haptic rain sensor and method for detecting precipitation are disclosed. In one aspect, the haptic rain sensor may measure rainfall characteristics including, in various embodiments, one or more of rainfall onset, rate, volume (e.g., accumulation and/or intensity), drop size distribution, and magnitude. Compared with conventional rainfall measurement devices, the system described herein is more accurate, has fewer false positive readings, and is more power efficient.

In various embodiments, a haptic rain sensor includes a piezo sensor and a processor. The processor may receive, via a communications interface, a signal from a piezo sensor. The processor may be configured to sample the signal at a sampling rate, determine a frequency domain representation of the sampled signal, determine that a magnitude of a resonant frequency associated with the sampled signal meets a threshold, and determine a valid precipitation event based at least in part on the determination that the magnitude of the resonant frequency meets the threshold.

In various embodiments, a haptic rain sensor includes a capacitive sensor, a piezo sensor, and a processor. The capacitive sensor may be configured to detect a presence of precipitation. The processor may be configured to detect a characteristic of the precipitation (e.g., rain onset, intensity, and accumulation) based at least in part on an output of the piezo sensor. For example, the piezo sensor may measure rainfall rate. The data from each of the piezo sensor and the capacitive sensor may be combined to provide accurate readings and reduce false positive readings. In various embodiments, the piezo sensor may be configured to be powered on in response to detection of the presence of the precipitation by the capacitive sensor. For example, the capacitive sensor allows the piezo sensor to be awoken when a precipitation event is detected. At other times, the piezo sensor can be powered down to reduce system power usage.

Figure 1:
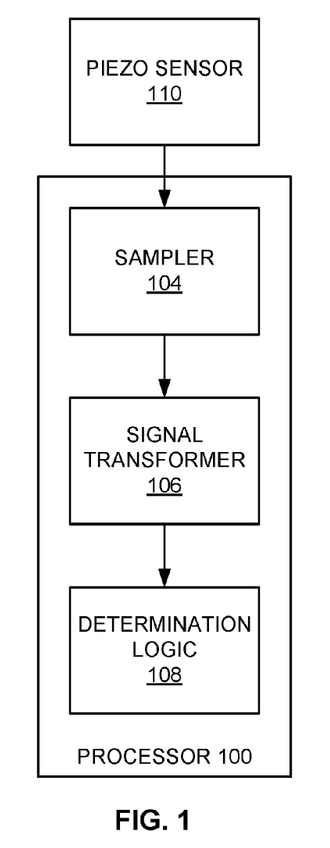
FIG. 1 is a block diagram illustrating an embodiment of a system for sensing rain.

FIG. 1 is a block diagram illustrating an embodiment of a system for sensing rain. In this example, the system includes a piezo sensor 110 and a processor 100.

The piezo sensor 110 is configured to measure characteristics of rainfall by converting a measured pressure (e.g., haptic effect) to electrical charge. An example of a piezo sensor is piezo sensor 202 of FIG. 2.

The processor 100 includes a sampler 104, a signal transformer 106, and determination logic 108. The sampler 204 may sample the signal received from the piezo sensor at a pre-defined sampling rate. The signal transformer 10 may determine a frequency domain representation of the sampled signal (e.g., applying a Fourier transform). The determination logic may be configured to execute instructions embodied as code running on the processor. The determination logic may detect a precipitation event and/or verify that a piezo or other haptic sensor reading is associated with precipitation. Processor 100 may be configured to execute the process shown in FIG. 3.

Figure 2:
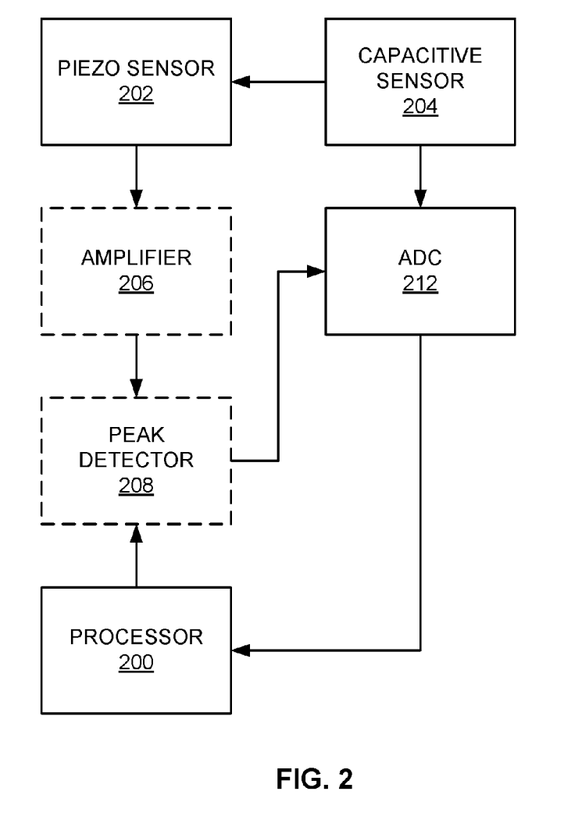
FIG. 2 is a block diagram illustrating an embodiment of a system for sensing rain.

FIG. 2 is a block diagram illustrating an embodiment of a system for sensing rain. In this example, the system includes a piezo sensor 202, a capacitive sensor 204, an analog-to-digital converter (ADC) 212, and a processor 200.

The piezo sensor 202 is configured to measure characteristics of rainfall by converting a measured pressure (e.g., haptic effect) to electrical charge. In various embodiments, the piezo sensor measures changes in pressure, acceleration, temperature, strain, or force The changes in pressure, acceleration, temperature, strain, or force might be caused by rainfall. Thus, characteristics of rainfall may be measured by a piezoelectric (e.g., haptic) effect. The piezo sensor may be implemented by a variety of piezo elements including a piezoelectric sensor, a piezo detector, and a piezo transducer. An example of a piezo sensor is piezo sensor 110 of FIG. 1.

Figure 3:
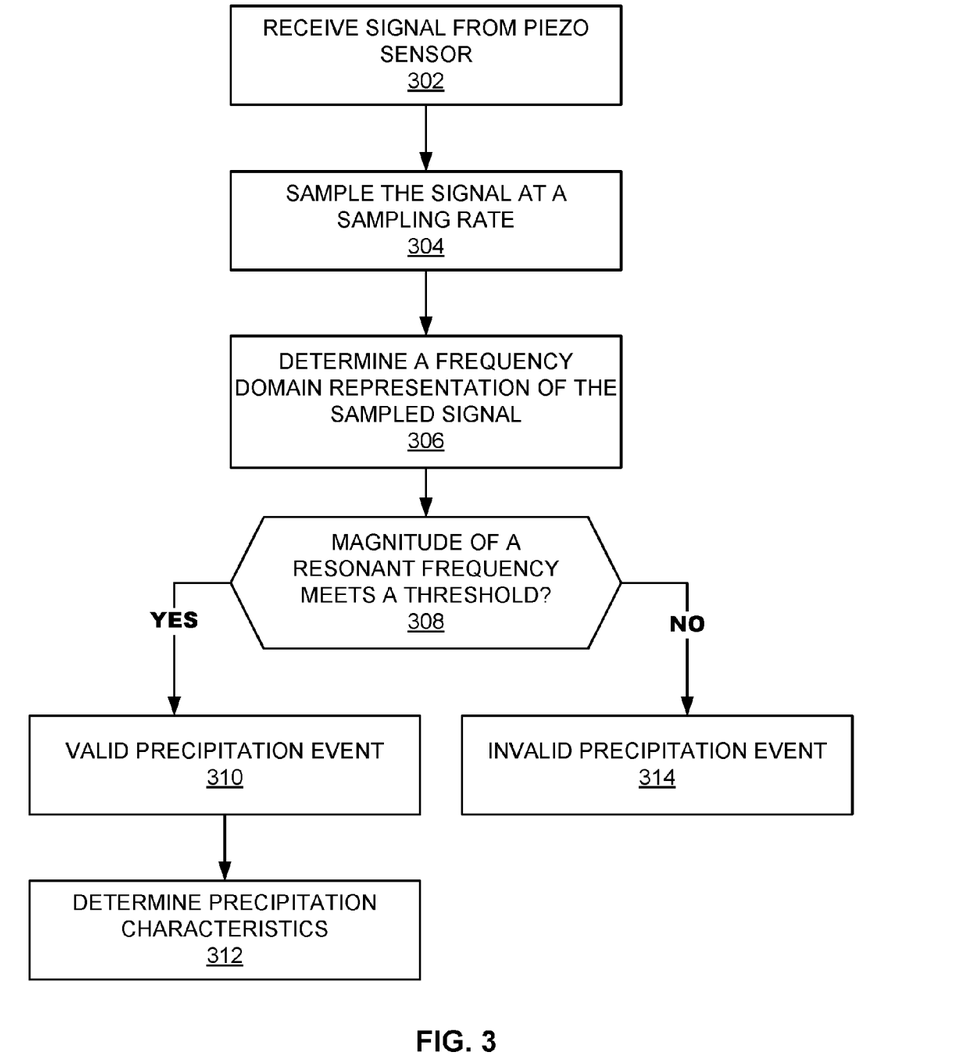
FIG. 3 is a flow chart illustrating an embodiment of a process for sensing rain.

The capacitive sensor 204 is configured to detect a presence or onset of precipitation. For example, the capacitive sensor may detect that is raining or it has begun raining. In various embodiments, sensor readings made by the capacitive sensor may be used to eliminate false positives. In various embodiments, while the piezo sensor is sampling a force of the drop, the capacitive sensor output is also recorded. The values of the piezo element and the capacitive sensor are compared. If the values do not correspond to a valid raindrop, the values are discarded. That is, the values may have been caused by something other than precipitation such as a passing bird. If the values do not correspond to a valid raindrop, this may be considered an invalid precipitation event. An example of a process for determining and eliminating false positives is further described with respect to FIG. 3. While in various embodiments disclosed herein a capacitive sensor is used to detect and/or verify a precipitation event, in various embodiments one or more other types of sensor may be used to detect a precipitation event and/or verify that a piezo or other haptic sensor reading is associated with precipitation. For example, FIGS. 1 and 3 illustrate a system and process for detecting and/or verifying a haptic sensor reading based on a set of instructions embodied in a non-transitory computer-readable medium.

Figure 4:
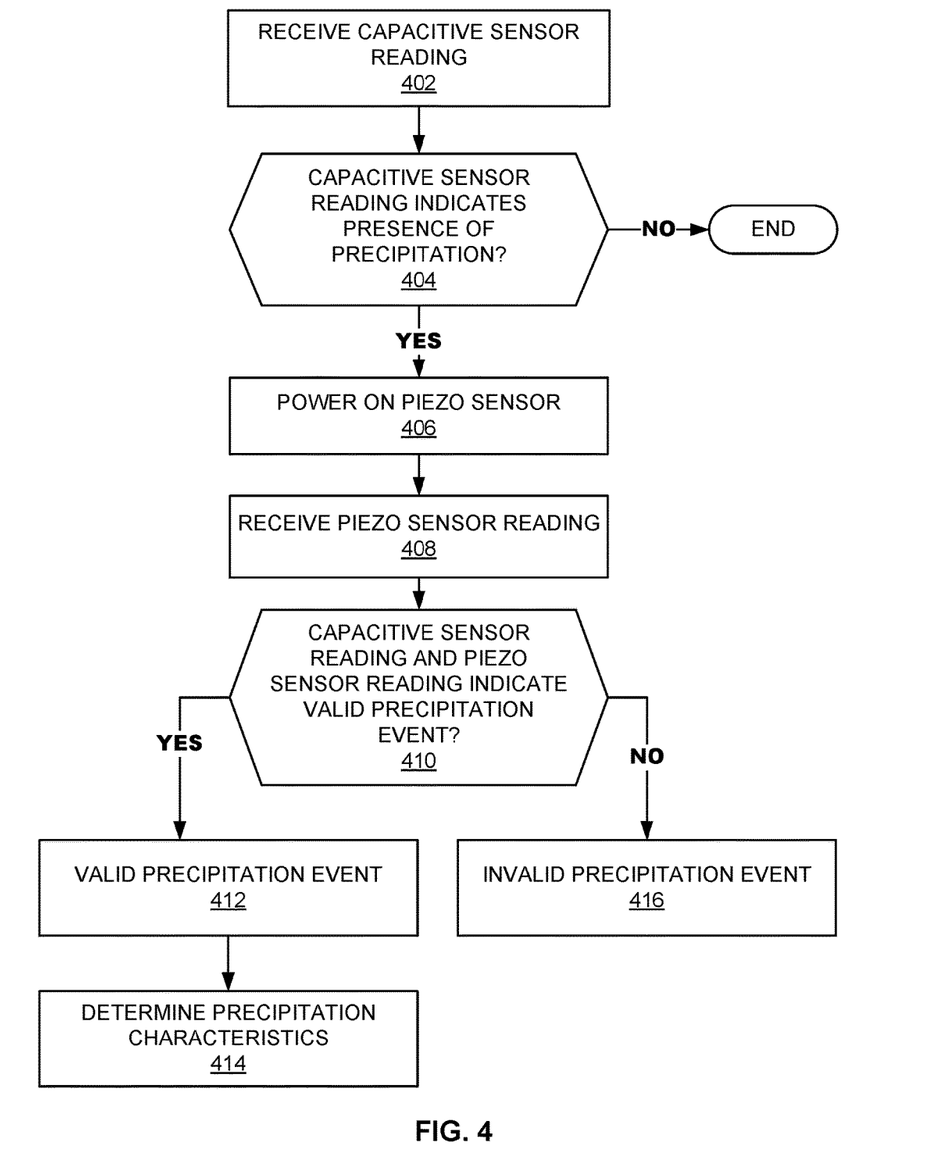
FIG. 4 is a flow chart illustrating an embodiment of a process for sensing rain.

Processor 200 is configured to be powered on in response to a capacitive reading by capacitive sensor 204 and determine rainfall characteristics based on a piezo reading by the piezo sensor 202. In a default state, processor 200 may be asleep to save power. For example, the processor is awoken in response to a valid precipitation event detected by the capacitive sensor. The processor may power down itself and/or power down the piezo sensor 202 if no precipitation is detected by the capacitive sensor during a pre-defined sampling period. An example of a process for waking the processor is shown in FIG. 4.

In various embodiments, the processor 200 is powered on when a precipitation event is detected by capacitive sensor 204. The processor may then power on the piezo detector and combine the signals from both sensors to determine characteristics of the precipitation such as a drop size and drop count. At the end of the sampling period, the number and size of drops may be used to calculate the rainfall rate and/or drop size distribution.

In some embodiments, the system includes an amplifier 206. The amplifier is configured to process piezo sensor readings. For example, the amplifier may amplify a signal detected by a piezo sensor. This may improve accuracy.

In some embodiments, the system includes a peak detector 208. The peak detector is configured to process piezo sensor readings to identify a size of a raindrop.

In operation, the piezo sensor 202 measures raindrop characteristics such as drop size or mass. For example, the piezo element detects the size of drops by converting a force of rain drops into an electrical signal. In some embodiments, the signal is passed to an amplifier 206 and a peak detector 208. When the voltage drops back to zero, processor 200 is awoken and converts the electrical signal into a voltage using ADC 212. After the conversion, processor 200 resets the peak detector.

FIG. 3 is a flow chart illustrating an embodiment of a process for sensing rain. The process of FIG. 3 may be at least in part implemented on one or more components of the system shown in FIG. 1. For example, processor 100 may be configured to perform the process of FIG. 3.

At 302, a signal is received from a piezo sensor. The signal may be caused by a possible precipitation event (e.g., a raindrop or set of raindrops) and the process of FIG. 3 may determine whether a precipitation event is valid or invalid based on the signal received from the piezo sensor. An example of a piezo sensor is 110 of FIGS. 1 and 202 of FIG. 2.

At 304, the signal is sampled at a sampling rate. The sampling rate may be pre-defined. For example, the sampling rate may be selected based on characteristics or a type of expected precipitation. In various embodiments, the sampling rate is twice the resonant frequency associated with the sampled signal.

At 306, a frequency domain representation of the sampled signal is determined. In various embodiments, a Fourier transform is applied to the sampled signal to obtain the frequency domain representation of the sampled signal.

At 308, whether a magnitude of a resonant frequency meets a threshold is determined. In various embodiments, the resonant frequency is a resonant frequency associated with the sampled signal. The threshold may be a predefined threshold selected based on the expected resonant frequency. In some embodiments, the threshold is 10 times an average magnitude of the sampled signal. Whether a precipitation event is valid is determined based at least in part on the resonant frequency exceeding the threshold.

If it is determined that the magnitude of the resonant frequency meets a threshold, it is determined that a precipitation event is valid (310). A valid precipitation event is an event that corresponds to precipitation (e.g., rainfall, snow, hail, etc.). Otherwise, if it is determined that the magnitude of the resonant frequency does not meet a threshold, it is determined that a precipitation event is invalid (314). An invalid precipitation event is an event that does not correspond to precipitation. For example, a signal may have been picked up due to someone mowing the lawn near the sensor, impacts to the mounting struction, or a passing bird leaving a memento on the sensor.

If the precipitation event is valid, the process proceeds to 312 in which one or more precipitation characteristics are determined. Precipitation characteristics that may be determined include drop size, precipitation rate, distribution of precipitation sizes, and the like. A drop size may be a size or mass of a unit of precipitation such as raindrop, snowflake, etc. A precipitation rate may be a rate of precipitation such as rainfall rate or intensity during a given time period. For example, the processor may determine and categorize rainfall intensity between light, moderate and torrential. The sampling accuracy may be substantially instantaneous and as accurate ±0.2 mm/hr. A distribution of precipitation sizes may be a quantity of drop sizes over a range of drop sizes. The processor may also determine rain accumulation over a time period such as a 1 hour time period or a 24 hour time period FIG. 4 is a flow chart illustrating an embodiment of a process for sensing rain. The process of FIG. 4 may be at least in part implemented on one or more components of the system shown in FIG. 2. For example, processor 200 may be configured to perform the process with respect to output received from piezo sensor 202 and capacitive sensor 204.

At 402, a capacitive sensor reading is received. The capacitive sensor reading may indicate whether precipitation is present (e.g., it is raining) or the onset of rain. An example of a capacitive sensor is 204 of FIG. 2.

At 404, it is determined whether a capacitive sensor reading indicates a presence of precipitation. A sensor reading may indicate presence of precipitation when a magnitude or direction of a unit of precipitation meets a profile or threshold, when a rate of precipitation meets a pattern, etc. An analog signal picked up by the capacitive sensor may be converted to a digital signal to analyze the signal and make comparisons with a baseline signal to determine whether the presence of precipitation is indicated.

If a presence of precipitation is not indicated, the process ends. In some embodiments, a capacitive sensor may continue to observe readings and report a signal when a sensor reading possibly indicating precipitation is captured.

Otherwise, if a presence of precipitation is indicated, the process proceeds to 406 in which a piezo sensor is powered on.

At 408, a piezo sensor reading is received. The reading may be caused by a possible precipitation event (e.g., a raindrop) and the process of FIG. 4 may determine whether a precipitation event is valid or invalid based on the signal received from the piezo sensor and, in various embodiments, in combination with the signal received from the capacitive sensor. An example of a piezo sensor is 110 of FIGS. 1 and 202 of FIG. 2.

At 410, it is determined whether the capacitive sensor reading and the piezo sensor reading indicate a valid precipitation event. If the capacitive sensor reading and the piezo sensor reading indicate a valid precipitation event, it is determined that a precipitation event is valid (412). A valid precipitation event is an event that corresponds to precipitation (e.g., rainfall, snow, hail, etc.). Otherwise, if the capacitive sensor reading and the piezo sensor reading do not indicate a valid precipitation event, it is determined that a precipitation event is invalid (416). An invalid precipitation event is an event that does not correspond to precipitation. For example, a signal may have been picked up due to someone watering the lawn near the sensor or a passing bird leaving a memento on the sensor.

At 414, one or more precipitation characteristics are determined. Precipitation characteristics that may be determined include drop size, precipitation rate, distribution of precipitation sizes, and the like. A drop size may be a size or mass of unit of precipitation such as raindrop, snowflake, etc. A precipitation rate may be a rate of precipitation such as rainfall rate during a given time period. A distribution of precipitation sizes may be a quantity of drop sizes over a range of drop sizes.

Figure 5:
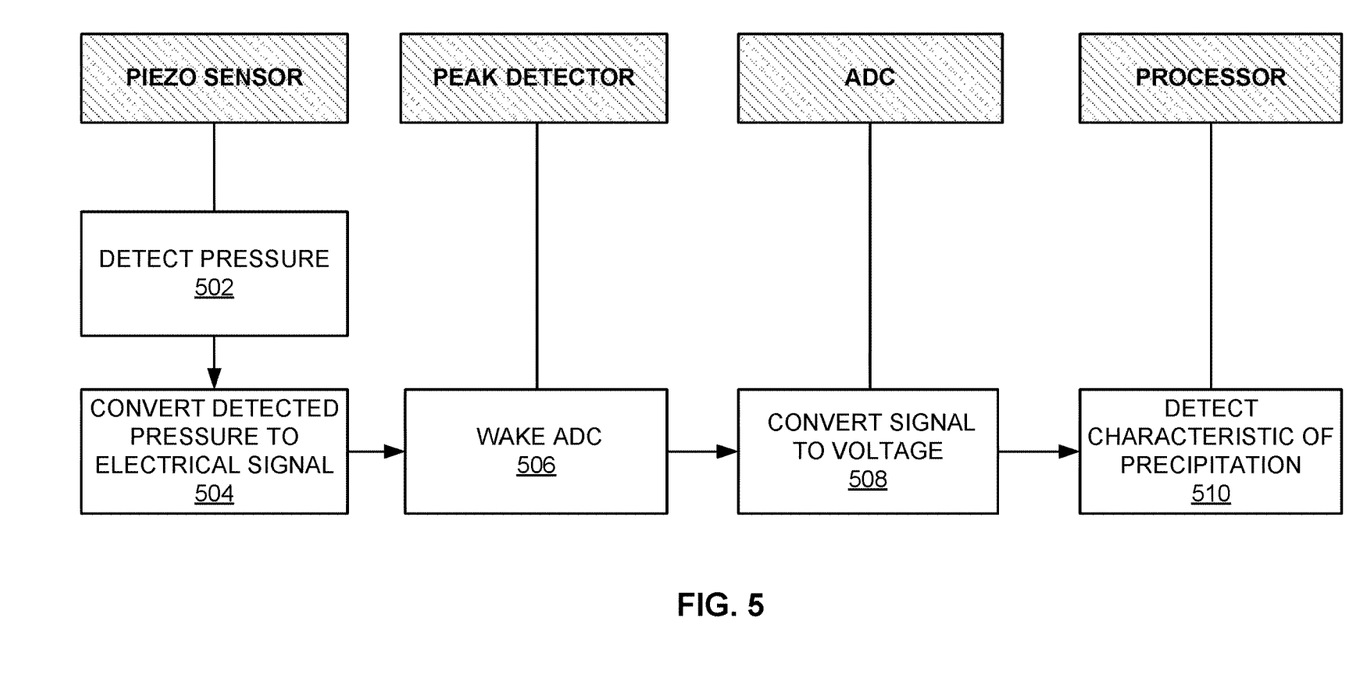
FIG. 5 is a flow chart illustrating an embodiment of a process for sensing rain.

FIG. 5 is a flow chart illustrating an embodiment of a process for sensing rain. The process of FIG. 5 may be at least in part implemented on one or more components of the system shown in FIG. 1. In some embodiments, at least a portion of the process of FIG. 5 is performed before 312 of FIG. 3 or 414 of FIG. 4.

In this example, a piezo sensor is configured to detect pressure (502) and convert the detected pressure to an electrical signal (504). An example of a piezo sensor is piezo sensor 110 of FIG. 1 and piezo sensor 202 of FIG. 2.

A peak detector is configured to wake an ADC (506). For example, if a detected peak meets a threshold, the ADC is awoken. This allows the ADC to remain powered down in a default state, which may provide power savings. An example of a peak detector is peak detector 208 of FIG. 2.

The ADC is configured to convert the digital electrical signal corresponding to the detected pressure to voltage (508). An example of an ADC is ADC 212 of FIG. 2.

A processor is configured to detect a characteristic of precipitation (510). Precipitation characteristics that may be determined include drop size, precipitation rate, distribution of precipitation sizes, and the like. A drop size may be a size or mass of unit of precipitation such as raindrop, snowflake, etc. A precipitation rate may be a rate of precipitation such as rainfall rate during a given time period. A distribution of precipitation sizes may be a quantity of drop sizes over a range of drop sizes. An example of a processor is processor 100 of FIG. 2 and processor 200 of FIG. 2.

Figure 6:
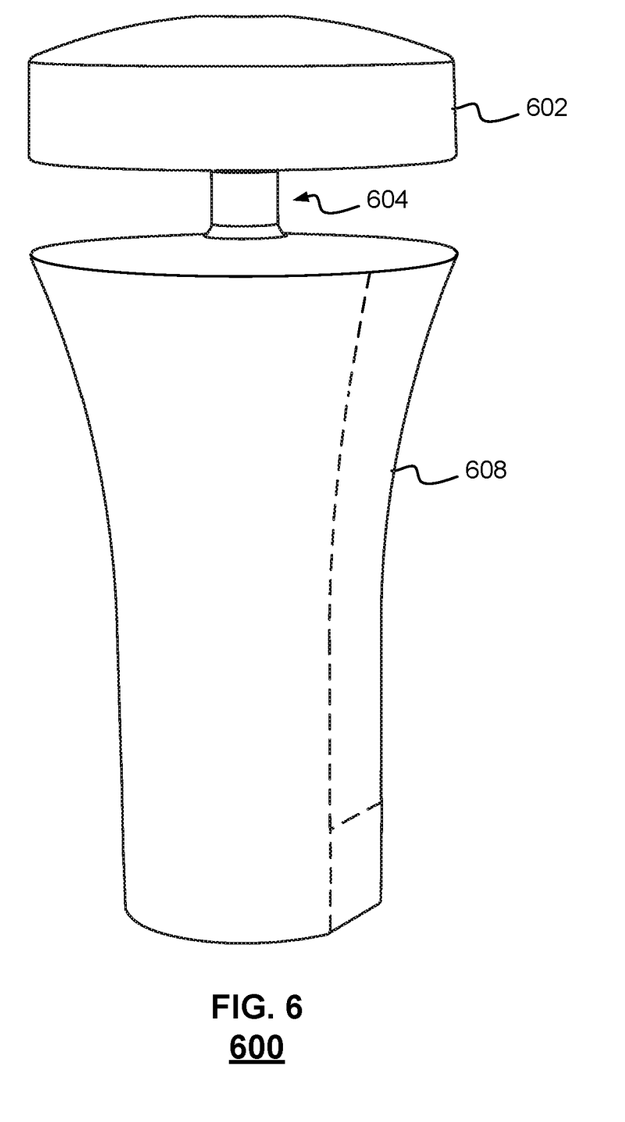
FIG. 6 is a block diagram illustrating an embodiment of a device for sensing rain.

FIG. 6 is a block diagram illustrating an embodiment of a device 600 for sensing rain. In various embodiments, the haptic rain detection components, processes, and techniques illustrated in FIGS. 1-5 are embodied in a haptic rain detection device such as the device shown in FIG. 6. The device includes a lid 602, a lower sensor housing 604, and exterior housing 608.

Lid 602 (also called a "cap" in some embodiments) may be structured as shown to protect contents of the lid and a space below the lid. For example, a space defined by a dome of the lid and bottom surface of the lid may hold sensors and other components. In some embodiments, precipitation falls on the dome of the lid and rolls off the lid without coming into contact with lid contents. An example of a lid and contents is shown in FIG. 7.

Lower sensor housing 604 may be mechanically coupled to the lid 602 to a body of the device 600. The lower sensor housing 604 may be structured to support sensors and/or support lid 602. In various embodiments, the lower sensor housing may be adapted to lower and raise the lid 602. The lid may be positioned via the lower sensor housing to a height specified by a user or automatically adjusted to a position suitable for detecting precipitation in a particular setting.

Exterior housing 608 may be structured as shown. For example, the housing may be tapered to allow the device to be easily held or positioned. The device may have a recess to receive a stake (not shown) on a base of the exterior housing to allow the device to be placed in the ground or on a structure such as a roof. For example, the device may have flexible mounting implemented by a keyhole slot, standard threads (e.g., ¼-20), or a pole mount (e.g., 1 inch). The device may be placed in any location with a clear view of the sky and, in some instances, clean wind fetch.

Figure 7:
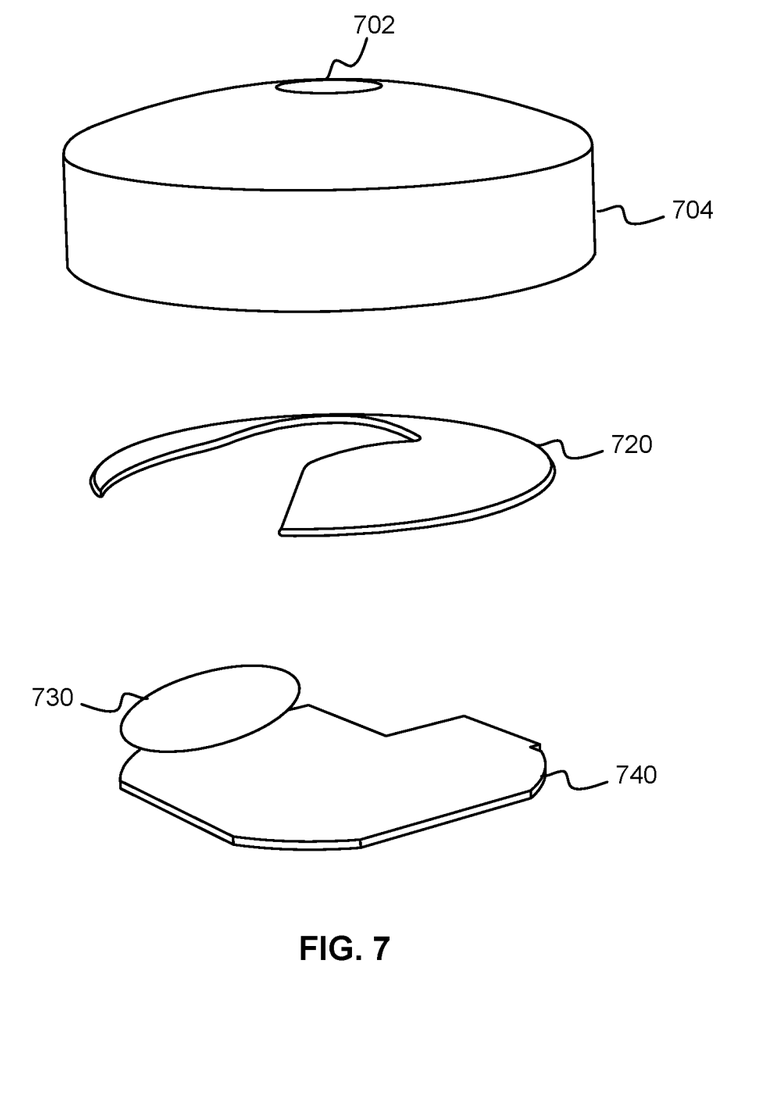
FIG. 7 is a block diagram illustrating an embodiment of a device for sensing rain.

FIG. 7 is a block diagram illustrating an embodiment of a device for sensing rain. In various embodiments, at least a portion of the haptic rain detection components, processes, and techniques illustrated in FIGS. 1-5 are embodied in a haptic rain detection device such as the device shown in FIG. 7. Here, the lid 704 is an example of lid 602 of FIG. 6.

The example shown in FIG. 7 is an exploded view of a lid and associated contents. For example, each of the components shown may nest inside the lid. Here, the lid 704 includes a window 702. The window may be a hole or a hole with a grid to allow to reach a sensor inside the lid. For example, a light sensor may determine ambient light, a UV index, or solar radiation from light observed through the window 702. In various embodiments, the lid conveys pulses to the piezo sensor. In some embodiments, there is no window in the lid.

A capacitive sensor may be provided inside the lid (not shown). For example, the capacitive sensor may be mounted to a top surface or dome of the lid. Capacitive sensor support 720 may be structured to support the capacitive sensor in its position with respect to the lid. For example, the capacitive sensor support may hold the capacitive sensor in place.

Piezo sensor 730 may be provided between capacitive sensor support 720 and PCB board 740. An example of a piezo sensor is 110 of FIGS. 1 and 202 of FIG. 2. Piezo sensor 730 is disk shaped and sized sufficiently to detect a pressure of rainfall.

PCB 740 may include electronic components configured to carry out procedures corresponding to processor 100 of FIG. 1, processor 200 of FIG. 2, and the other processes described herein. For simplicity, PCB 740 is represented by a simple board. The PCB may be patterned and traces laid down on the PCB to implement the processors described herein.

The system and processes described herein find application in a variety of settings. Although primarily described using the example of detecting rainfall presence and characteristics, the systems and processes here can also be configured to detect other types of precipitation and other weather conditions such as wind, sunlight, and UV index. The devices may have network connectivity including Wi-Fi® and Bluetooth ®. The devices may report data to a remote server.

The devices described herein may be provided as part of a smart home network or connected to an Internet of Things and controlled by an app on mobile device or other computer. The devices may be part of a modular network of devices to form a weather station. The data collected and determined by the systems and processes described herein can save time and money, increase safety, and improve home health. Processor 100 of FIG. 1 and processor 200 of FIG. 2 may be local to the device or provided remotely. In various embodiments, the device shown in FIGS. 6 and 7 connect via long range telemetry to an indoor receiving hub. The hub may be configured to publish data to a cloud or remote server via a network such as a wireless network or to publish data locally to a mobile device or other computer via a network protocol such as Bluetooth® Low Energy.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for detecting precipitation, the system comprising:
   a capacitive sensor configured to detect a presence of precipitation;
   a piezo sensor configured to be powered on in response to detection of the presence of the precipitation by the capacitive sensor; and
   a processor configured to:
      detect a characteristic of the precipitation based at least in part on an output of the piezo sensor, and
      power down the piezo sensor in response to absence of detected precipitation during a predefined sampling period.

2. The system of claim 1, further comprising a peak detector, wherein the peak detector wakes the processor in response to pressure detected by the piezo sensor exceeding a threshold.

3. The system of claim 2, wherein the processor is further configured to:
   determine a magnitude of a voltage corresponding to the pressure detected by the piezo sensor; and
   determine a size of the precipitation based on the magnitude of the voltage.

4. The system of claim 1, further comprising a peak detector, wherein the peak detector wakes an analog-to-digital converter in response to pressure detected by the piezo sensor exceeding a threshold.

5. The system of claim 1, wherein the processor is configured to detect the characteristic of the precipitation based at least in part on an output of the capacitive sensor.

6. The system of claim 1, wherein the processor is further configured to determine a drop size of the precipitation based at least in part on the output of the piezo sensor.

7. The system of claim 1, wherein the processor is further configured to determine a precipitation rate based at least in part on the output of the piezo sensor.

8. The system of claim 1, wherein the processor is further configured to determine a distribution of precipitation sizes based at least in part on the output of the piezo sensor.

9. The system of claim 1, further comprising an amplifier configured to process an output of the piezo sensor prior to processing by the processor.

10. The system of claim 1 further comprising an analog-to-digital converter configured to convert an output of the capacitive sensor to a digital signal.

11. The system of claim 1, wherein the processor is further configured to identify a false positive based on a comparison between the output of the piezo sensor and an output of the capacitive sensor.

12. The system of claim 1, wherein the piezo sensor is provided between the capacitive sensor and the processor.

* * * * *

UNITED STATES PATENT AND TRADEMARK OFFICE
CERTIFICATE OF CORRECTION

PATENT NO. : 10,520,646 B2  
APPLICATION NO. : 15/594388  
DATED : December 31, 2019  
INVENTOR(S) : Robert John Derr and David St. John Page 1 of 1

It is certified that error appears in the above-identified patent and that said Letters Patent is hereby corrected as shown below:

In the Specification

In Column 3, Line(s) 9, after "force", insert --.--.
In Column 4, Line(s) 19, delete "FIGS. 1" and insert --FIG. 1--, therefor.

In the Claims

In Column 8, Line(s) 43, Claim 10, after "claim 1", insert --,--.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*